(12) United States Patent
Sehsah et al.

(10) Patent No.: US 11,426,809 B2
(45) Date of Patent: Aug. 30, 2022

(54) PIPE CUTTING TOOL

(71) Applicant: Saudi Arabian Oil Company, Dhahran (SA)

(72) Inventors: Ossama R. Sehsah, Al Khobar (SA); Muhammad Muqeem, Dhahran (SA); Fauzia Waluyo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/173,410

(22) Filed: Feb. 11, 2021

(65) Prior Publication Data

US 2021/0162524 A1 Jun. 3, 2021

Related U.S. Application Data

(62) Division of application No. 16/247,151, filed on Jan. 14, 2019, now Pat. No. 10,946,463.

(51) Int. Cl.
*B23D 59/00* (2006.01)
*B23D 45/00* (2006.01)
*B23D 45/10* (2006.01)

(52) U.S. Cl.
CPC ......... *B23D 59/002* (2013.01); *B23D 45/003* (2013.01); *B23D 45/10* (2013.01); *B23D 59/008* (2013.01)

(58) Field of Classification Search
CPC .. B23D 59/002; B23D 59/008; B23D 45/003; B23D 45/10
See application file for complete search history.

(56) References Cited

U.S. PATENT DOCUMENTS

| 2,915,819 | A | 12/1959 | O'Day et al. |
| 3,598,005 | A | 8/1971 | Shafer |
| 3,603,387 | A | 9/1971 | Schoeffler |
| 3,859,877 | A | 1/1975 | Sherer et al. |

(Continued)

FOREIGN PATENT DOCUMENTS

WO    WO-2020/148575 A1    7/2020

OTHER PUBLICATIONS

Baker Hughes, a GE company, Downhole Electric Cutting Tool (DECT), Cut oilfield tubulars with precision control and no external damage, Sell Sheet, 2 pages (2019).

(Continued)

*Primary Examiner* — Omar Flores Sanchez
(74) *Attorney, Agent, or Firm* — Osha Bergman Watanabe & Burton LLP

(57) ABSTRACT

An example pipe cutting tool includes a plurality of actuators and a plurality of cutters. Each of the plurality of cutters is connected to at least one separate actuator of the plurality of actuators. The at least one separate actuator is configured to move the cutter between a pre-deployed and deployed position. The deployed position is beyond the pre-deployed position. The plurality of cutters may include a first and second cutter, with the at least one separate actuator connected to the second cutter moving based, at least in part, on one or more cutting conditions. An example method of cutting a pipe includes extending a first cutter to contact the pipe, cutting at least a portion of the pipe using the first cutter, detecting a cutting condition, extending a second cutter based, at least in part, on the cutting condition, and resuming the cutting using the second cutter.

17 Claims, 6 Drawing Sheets

(56) References Cited

U.S. PATENT DOCUMENTS

| | | | |
|---|---|---|---|
| 4,389,765 | A | 6/1983 | Thompson, Jr. |
| 4,577,406 | A | 3/1986 | Idzik et al. |
| 4,768,899 | A | 9/1988 | Dysarz |
| 5,012,863 | A | 5/1991 | Springer |
| 6,183,165 | B1 | 2/2001 | Heinrichs et al. |
| 8,528,630 | B2 | 9/2013 | Tunget |
| 8,602,101 | B2 | 12/2013 | Gibson et al. |
| 10,369,719 | B1 | 8/2019 | Lix et al. |
| 10,427,226 | B2 | 10/2019 | Mihailescu et al. |
| 10,946,463 | B2 | 3/2021 | Sehsah et al. |
| 2004/0112587 | A1 | 6/2004 | Van Drentham Susman et al. |
| 2012/0029702 | A1 | 2/2012 | Tverlid |
| 2013/0199785 | A1 | 8/2013 | Hekelaar |
| 2017/0191327 | A9 | 7/2017 | Motland |
| 2020/0222997 | A1 | 7/2020 | Sehsah et al. |

OTHER PUBLICATIONS

Baker Hughes, a GE Company, Downhole Electric Cutting Tool (DECT), Safe, reliable, and precise, 2 pages. URL: https://www.bhge.com/upstream/evaluation/wireline-products-and-equipment/downhole-equipment/downhole-electric-cutting-tool-dect [Retrieved Jul. 18, 2019].

Baker Hughes, a GE Company, Mechanical Pipe Cutter (MPC), Reduce NPT with fast, reliable pipe cutting, 2 pages. URL: https://www.bhge.com/upstream/well-intervention/pipe-recovery/mechanical-pipe-cutter-mpc [Retrieved Jul. 18, 2019].

Baker Hughes, a GE company, Mechanical Pipe Cutter, Achieve fast and effective recovery of downhold pipe, Sell Sheet, 2 pages (revised Apr. 2019).

Halliburton, Drill Collar Severing Tool (DCST), Wireline & Perforating, Pipe Recordery Services, 2 pages (Mar. 2015).

International Search Report for PCT/IB2019/051468, 6 pages (dated Nov. 18, 2019).

Invitation to Pay Additional Fee for PCT/IB2019/051468, 10 pages (mailed Sep. 23, 2019).

Schlumberger, CutMasterX3, Hydraulic multicycle pipe cutter, 1 page (2013).

Schlumberger, Extended Reach Hydraulic Pipe Cutter, 1 page (2011).

Schlumberger, Hydraulic Pipe Cutter, Reliable severing of single or multiple casing strings, 1 page (2013).

Written Opinion for PCT/IB2019/051468, 11 pages (dated Nov. 18, 2019).

PIPE CUTTING TOOL

PRIORITY APPLICATION

This application is a division of U.S. patent application Ser. No. 16/247,151, filed on Jan. 14, 2019, the disclosure of which is hereby incorporated by reference herein in its entirety.

TECHNICAL FIELD

This specification describes examples of tools for cutting pipes and methods of using those tools.

BACKGROUND

In the oil and gas industry, pipes, such as steel pipes, are used in many downhole applications. For example, pipes may be used as drill pipes, as bottom hole assemblies, and in well casing or tubing. In some cases, a pipe may become stuck while drilling, tripping, or running casing or tubing. The stuck pipe may be cut if attempts to extract the stuck pipe are not successful. A pipe cutting tool may be inserted into the stuck pipe and used to cut the stuck pipe at a location downhole.

SUMMARY

An example pipe cutting tool is configured to cut pipes in a wellbore. The pipe cutting tool includes a plurality of actuators and a plurality of cutters. Each of the cutters is connected to at least one separate actuator. For each cutter, the separate actuator is configured to move the cutter between a pre-deployed position and a deployed position. The deployed position is beyond the pre-deployed position. The pipe cutting tool may include one or more of the following features, either alone or in combination.

The plurality of cutters may include a first cutter and a second cutter. The second cutter may be configured to move from the pre-deployed position to the deployed position automatically based, at least in part, on one or more cutting conditions. The one or more cutting conditions may include a first cutter pressure that exceeds an initial or preset first cutter pressure by a predetermined amount. The pipe cutting tool may include a controller configured to output actuation signals automatically based, at least in part, on the one or more cutting conditions. The second cutter may be configured to move independently from each other cutter.

The pipe cutting tool may further include one or more sensors associated with each of the plurality of cutters that output sensor signals. The one or more sensors are for outputting sensor signals. The pipe cutting tool may include a controller configured to determine the one or more cutting conditions based on the sensor signals.

The pipe cutting tool may further include a cutter imaging monitor configured to monitor at least one of the plurality of cutters during operation. The cutter imaging monitor may include one or more of an x-ray imaging monitor, an optical camera, or an acoustic camera. The cutter imaging monitor may be configured to send a monitoring signal to a remote computing system. The monitoring signal may represent real-time operation of one or more of the cutters. In this regard, real-time may not mean that monitoring and operation are simultaneous but rather may include actions that occur on a continuous basis or track each other in time taking into account delays associated with processing, data transmission, and hardware.

The pipe cutting tool may further include a controller configured to set the deployed position based on a radius of a pipe to be cut. The plurality of cutters may be configured such that only one of the plurality of cutters cuts at a time. The plurality of cutters may include a first cutter, a second cutter, and a third cutter. The third cutter may be redundant to the first cutter and to the second cutter.

The pipe cutting tool may further include a housing to hold the one or more actuators and the plurality of cutters. The housing may have an outer diameter of less than 3 inches (in) (76.2 millimeters—mm). The cutters may be disposed entirely within the housing in their pre-deployed positions and extend at least partially outside of the housing in their deployed positions. A radial extent of a cutter from a central axis of the pipe cutting tool may be less than 3 in (76.2 mm) when the cutter is in the pre-deployed position. A radial extent of a cutter from a central axis of the pipe cutting tool may be at least 4.5 in (114.3 mm) when the cutter is in the deployed position. The plurality of cutters may have a radial extent in the deployed position that is a same distance from a central axis of the pipe cutting tool. Each cutter may lie at least partially in a common horizontal plane when in the deployed position. In the deployed position, one or more of the cutters may be angled relative to the common horizontal plane.

Each one of the plurality of cutters may be connected to a single one of the plurality of actuators. The pipe cutting tool may include a controller to send actuation signals to the plurality of actuators to cause the plurality of actuators to move independently. The plurality of actuators may be configured to provide at least 750 pounds per square inch (psi) (5.2 megapascal—MPa) of outward pressure to each cutter making a cut during cutting. Each of the plurality of actuators may include a piston. The pipe cutting tool may include a controller configured to output a control signal. The plurality of actuators each may be configured to supply a controlled cutting pressure based one the control signal.

The cutters may include a rotatable blade, a blade hub, and an arm. The blade hub may be configured to cause the rotatable blade to rotate about a central axis of the blade hub. The blade hub may be connected to the arm at a first end of the arm. The arm may be connected to the one of the plurality of actuators at a second end of the arm opposite the first end.

An example pipe cutting tool includes a plurality of cutters and an actuator connected physically to the plurality of cutters. The actuator may be configured to extend and to retract to move each of the plurality of cutters between a deployed position and a pre-deployed position, respectively. The pipe cutting tool further includes one or more sensors for monitoring one or more conditions associated with the plurality of cutters. The pipe cutting tool further includes a control system for outputting one or more signals to control extending or retracting the actuator based on the one or more conditions.

An example method for cutting a pipe includes extending a first cutter to contact the pipe. The method includes cutting at least a portion of the pipe using the first cutter. The method includes detecting a cutting condition during cutting performed by the first cutter. The method includes extending a second cutter that is redundant to the first cutter based, at least in part, on the cutting condition. The method includes resuming the cutting using the second cutter. The method may include one or more of the following features, either alone or in combination.

Extending the second cutter may occur automatically upon detecting the cutting condition. Detecting may be performed automatically by a controller. The method may further include automatically deactivating the first cutter based, at least in part, on the cutting condition. Deactivating the first cutter may include retracting the first cutter. Deactivating the first cutter may include stopping the first cutter. The method may further include extending a third cutter that is redundant to the first cutter and to the second cutter based, at least in part, on a second cutting condition. The method may further include automatically deactivating the second cutter, based at least in part, on determining a second cutting condition. The cutting condition, or the second cutting condition, or both may include a pressure that exceeds a specified cutter pressure by a predetermined amount.

The first cutter may be extended by a first actuator in response to an actuation signal output by a controller. The second cutter may be extended by a second actuator in response to an actuation signal output by the controller. The first actuator may be separate from the second actuator. The second actuator may provide at least 750 psi (5.17 MPa) of outward pressure to the second cutter during cutting by the second cutter. The method may further include setting, by a controller, either a deployed position of the first cutter or a deployed position of the second cutter or both. A radial extent of the first cutter from the central axis may be at least 4.5 inches (114.3 mm) when the first cutter is in the deployed position. If the first cutter and the second cutter are both in a deployed position, the first cutter and the second cutter may be at least partially in a common plane. At least one of the first cutter and the second cutter may be angled relative to the common plane when in a deployed position.

The first cutter and the second cutter may each include a rotatable blade and a blade hub. The blade hub may be configured to cause the rotatable blade to rotate about a central axis of the blade hub. The blade hub may be connected to an arm that is connected to an actuator. An actuator connected to the first cutter may be separate from an actuator connected to the second cutter.

The method may further include monitoring the first cutter during cutting using an optical camera, an x-ray imaging monitor, or an acoustic camera.

Advantages of the example pipe cutting tools may include one or more of the following. Use of redundant cutters may increase the pipe cutting tool's reliability since failure of a single cutter will not disable the tool completely. The pipe cutting tool may improve cutting efficiency and reliability through monitoring one or more cutting conditions to determine when to deploy one or more of the redundant cutters. Automatic deployment of the redundant cutters may reduce the need for continuous monitoring of the well by a drilling engineer.

Any two or more of the features described in this specification, including in this summary section, may be combined to form implementations not specifically described in this specification.

At least part of the tools and processes described in this specification may be controlled by executing, on one or more processing devices, instructions that are stored on one or more non-transitory machine-readable storage media. Examples of non-transitory machine-readable storage media include read-only memory (ROM), an optical disk drive, memory disk drive, and random access memory (RAM). At least part of the tools and processes described in this specification may be controlled using a data processing system comprised of one or more processing devices and memory storing instructions that are executable by the one or more processing devices to perform various control operations.

The details of one or more implementations are set forth in the accompanying drawings and the description subsequently. Other features and advantages will be apparent from the description and drawings, and from the claims.

DESCRIPTION OF THE DRAWINGS

Like reference numerals in the figures indicate like elements.

DETAILED DESCRIPTION

Described in this specification are implementations of pipe cutting tools that are configured to cut pipes, such as pipes located in wellbores. An example pipe cutting tool includes a plurality of cutters and, optionally, a housing. A cutter includes a blade or other structure that is controllable to cut through the pipe entirely or part-way. At least one of the cutters is redundant. A cutter may be redundant in the sense that it may perform the same cutting function as one or more other cutters. For example, the pipe cutting tool may include three cutters. One of the cutters is a primary cutter and the other two cutters are the redundant cutters.

In some implementations, the cutters are connected to one or more actuators. In some implementations, each of the actuators is disposed within the housing. Each cutter may be connected to a single actuator that is configured to move the cutter between a pre-deployed position and a deployed position. In this example, each cutter is independently movable. In some implementations, each cutter in the pipe cutting tool is connected to its own separate actuator. In some implementations, two or more of the cutters may be connected to a single, common actuator that is configured to move each of the cutters between a pre-deployed position and a deployed position. For example, every cutter in the pipe cutting tool may be connected to a single, common actuator. In this example, each cutter is not independently movable. In some implementations, one or more cutters in the pipe cutting tool are each connected to their own separate actuator and other cutters are connected to a single, common actuator.

In general, cutters in the pipe cutting tool can include any type of device that is able to cut through all or part of a pipe. Example pipes include, but are not limited to, casing pipes, tubing pipes, drilling pipes, and bottom-hole assembly pipes. The pipes may be made of metal, composite, plastic, or a combination of these materials. Cutters in the pipe cutting tool may include mechanical cutters, such as rotatable blades or knives. A rotatable blade is shown in the figures. The rotatable blade may include a tungsten carbide blade having teeth around its circumference. In some implementations, the rotatable blade is connected to a blade hub so that the rotatable blade is able to rotate about a central axis of the blade hub. The pipe cutting tool may be configured—for example programmed—to start rotating a rotatable blade of a cutter while the cutter is being moved from its pre-deployed to deployed position. Alternatively, the pipe cutting tool may be configured—for example programmed—to start rotating the blade when the cutter reaches its deployed position. In some implementations, cutters may include chemical cutters, such as plasma torches.

Figure 1A:
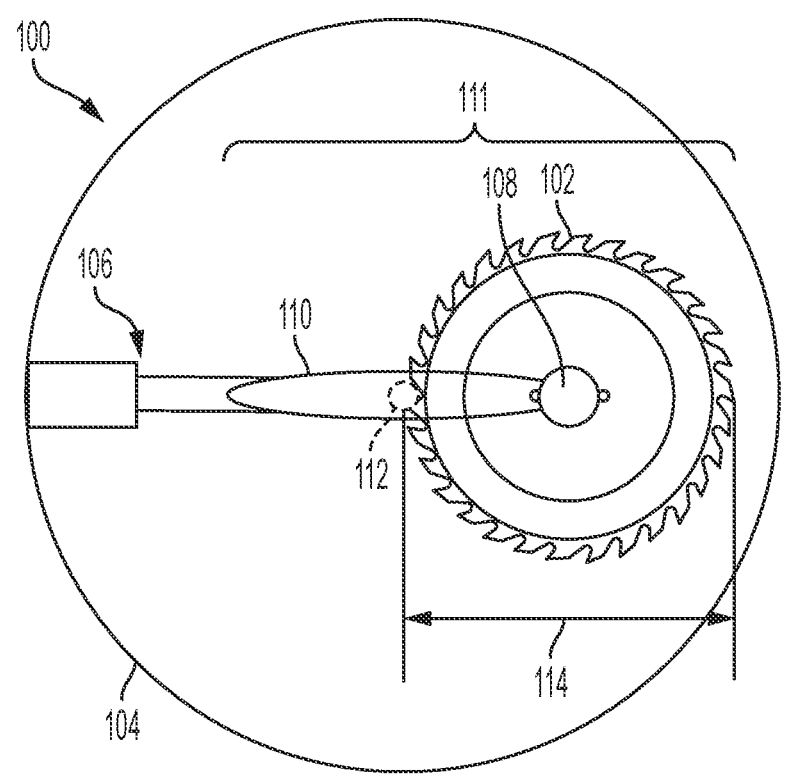
FIG. 1A is a plan view of one cutter among a plurality of cutters in an example pipe cutting tool, where the one cutter is in a pre-deployed position.
Figure 1B:
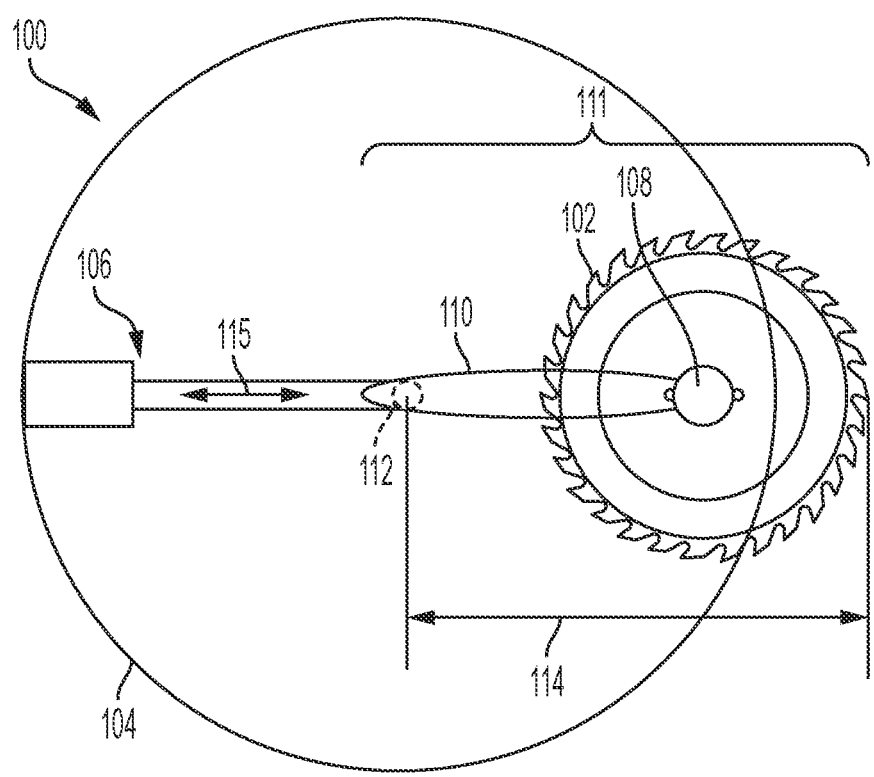
FIG. 1B is a plan view of the pipe cutting tool of FIG. 1A, where the one cutter is in a deployed position.

An example pipe cutting tool 100 is shown in FIGS. 1A and 1B. In this example, only a first (primary) cutter 111 is shown, although other redundant cutters are included in the pipe cutting tool 100 but are not shown. Pipe cutting tool 100 includes a cutter 111, an actuator 106, and a housing 104. In FIG. 1A, cutter 111 is in a pre-deployed position. In this example, in the pre-deployed position, cutter 111 is entirely within housing 104. FIG. 1B shows cutter 111 in a deployed position. In the deployed position, cutter 111 extends at least partially outside of housing 104, thus being in a position where the cutter is able to cut a pipe. In this example, actuator 106 is disposed entirely within housing 104 in both the pre-deployed and deployed positions.

In this example, the pre-deployed position of the cutter includes a position in which the cutter is at or near its minimal radial extent from a central axis of the pipe cutting tool (for example, before being deployed to cut). The deployed position of the cutter includes a position in which (i) at least a portion of the cutter is outside of the housing of the pipe cutting tool and (ii) the radial extent of the cutter from the central axis is greater than in the pre-deployed position. The central axis of the pipe cutting tool includes an axis that runs through the center of the pipe cutting tool along its longest dimension. For example, the central axis is the longitudinal axis of the pipe cutting tool. In some examples, each cutter is extendible to reach a circle centered at the point or axis that intersects at least one point that is to be cut. An actuator controls the cutter to move between the pre-deployed position and the deployed position.

In some implementations, the actuator includes a component configured for mechanical movement between two positions. An example actuator includes a piston. For example, the actuator may be a hydraulic piston or a pneumatic piston. The actuator may include a spring loading and unloading mechanism to operate. The actuator may be disposed within the housing of the pipe cutting tool. For example, the actuator may be mounted on the housing. In some examples, the actuator may be configured to position the cutter only between two discrete states: a fully contracted state and a fully extended state. In some examples, the actuator may be configured to position the cutter at any point in a continuum between the two discrete states. In some implementations, the actuator is electronically controlled by a controller such that sending a signal from the controller causes actuation of the actuator. In some implementations, the actuator is configured to move the cutter along an axis aligned with the direction of motion of a cutter between its pre-deployed and deployed positions. For example, the actuator may actuate horizontally to move the cutter horizontally (in the plane of housing 104) between the pre-deployed position and deployed position.

The actuator may be configured—for example, constructed, arranged, or both constructed and arranged—to apply pressure to the cutter during cutting. Example pressures include at least 500 psi (3.45 MPa), at least 750 psi (5.17 MPa), or at least 900 psi (6.21 MPa). The pressure may be applied to each cutter that is making a cut during cutting. The pressure applied by an actuator may be controllable by the controller and may depend on an actuation signal provided by the controller. Similarly, the actuator may be configured to move the cutter into a deployed position in which the cutter extends from a central axis of the pipe cutting tool at least 4.5 inches (in) (114.3 mm), at least 5 in (127 mm), at least 5.5 in (139.7 mm), at least 6 in (152.4 mm), or at least 8 in (203.2 mm).

Any appropriate controller configured to sends signals to the actuators and to receive data inputs may be used. For example, a controller may include a programmable logic controller or a microprocessor. The pipe cutting tool may include a control system comprised of a single controller or multiple controllers. For example, the single controller may control all cutters, all actuators, or both all cutters and all actuators included on the pipe cutting tool. In the case of multiple controllers, each cutter, each actuator, or each set of independent cutter and actuator(s) may include its own separate controller. That controller may control its corresponding cutter.

The pipe cutting tool may also include one or more sensors, such as environmental sensors including, for example, one or more of each of the following: temperature sensors, pressure sensors, erosion sensors, and acoustic sensors. One or more of these sensors may be located on, or proximate to, each cutter. Output readings from the sensors may be transmitted to each controller or to each corresponding controller. Transmission may be via wired or wireless media. The controllers may send the readings to a computing system at the surface or the controllers may use the readings to affect or to control operation of the cutters.

Each controller may be on-board the pipe cutting tool in the sense that it is located on the tool itself or downhole with the tool, rather than at the surface. The controller may communicate with the computing system that is located uphole to control operation and movement of the pipe cutting tool. For example, the controller may cooperate with the computing system to control operation of the pipe cutting tool based on sensor readings as described in this specification. For example, the controller may be configured—for example programmed—prior to operation to implement control instructions in a sequence during operation absent user intervention. Alternatively, the controller may receive instructions from uphole computing system to control the tool.

Cutter 111 includes rotatable blade 102, blade hub 108 about which rotatable blade 102 rotates, and arm 110. In an example, arm 110 includes a fixed structure that connects a blade hub to an actuator. In this case, arm 110 connects blade hub 108 and actuator 106. The arm may include a coupler or fastener between the blade hub and the actuator. The other cutters in pipe cutting tool 100 (not shown) may be disposed, for example, in a stacked pre-deployed configuration with cutter 111. In this example, each cutter has its own actuator. For example, there may be three cutters. Each of the other two cutters may have the same structure and function as cutter 111. When in their deployed positions, the cutters may be at least partially in a common plane and fanned-out.

Cutter 111 is configured—for example, connected, constructed, or arranged—to move radially relative to axis 112 of the pipe cutting tool. For example, in the pre-deployed position (FIG. 1A), the cutter is retracted within housing 104. For example, in the deployed position (FIG. 1B), the cutter is extended beyond housing 104. Thus, as shown, the radial extent 114 of the cutter 111 in the deployed position is greater than the radial extent 114 in the pre-deployed position. The directions of movement of actuator 106 are shown by double arrowed line 115 in FIG. 1B. As previously explained, an actuator 106 is configured to move the cutter between the pre-deployed position and deployed position. In some implementations, actuator 106 is controlled by an actuation signal sent by the controller.

The controller may automatically send the actuation signal based, at least in part, on one or more cutting conditions that are determined to be present within the pipe. In some implementations, one or more cutting conditions that cause the controller to output the actuation signal include a cutter pressure exceeding an initial or preset cutter pressure by a predetermined amount. The cutter pressure includes the pressure on the cutter as a result of forcing the cutter against a pipe during cutting. The cutter pressure may increase to the point where such a condition is met, for example, because the cutter is becoming dull from use or due to lack of efficiency in the cut. In some implementations, each cutter includes a sensor and the controller is configured to determine one or more cutting conditions for each cutter based on input from the sensor. Examples of sensors were provided previously and include pressure sensors, temperature sensors, erosion sensors, acoustic sensors, and accelerometers. In some implementations, a pressure sensor of a cutter in a pipe cutting tool is configured and arranged to measure the pressure being applied to the cutter during cutting.

Pipe cutting tools may improve cutting performance by automatically changing out cutters based on local conditions during cutting. For example, the controller may receive a reading from a pressure sensor indicating that the pressure on a cutter during use exceeds a predefined maximum pressure. In response, the controller may stop operation of the cutter and retract the cutter. A different, redundant cutter may then be extended to resume the cutting. This may be done automatically, for example, without intervention or instruction from a user.

In some implementations, the pipe cutting tool includes a cutter imaging monitor configured—for example, constructed and arranged—to monitor one or more cutters in substantially real-time while cutting. For example, real-time monitoring may allow a user to view the output of the cutter imaging monitor as it occurs without intentional delay, understanding that there may be some time lag associated with transmitting and processing data from the cutter imaging monitor. The cutter imaging monitor may be, but is not necessarily, arranged relative to the cutter to provide a full view of a region being cut. For example, a view of the cutter imaging monitor may include a full view of the portion of the cutter, such as a rotatable blade, that actively cuts a pipe and the full interface between the cutter and the pipe.

The cutter imaging monitor may be configured to capture video, relatively high framerate still images, or both, such as images having a framerate of at least 5 frames per second. The cutter imaging monitor may be or include one or more of an x-ray imaging monitor, an optical camera, or an acoustic camera. In some implementations, any type of optical camera that senses visible wavelengths may be used. A light may be used in combination with an optical camera to provide illumination of the field of view that is monitored by the camera. An example optical camera includes a charge-coupled device (CCD) camera. The optical camera may be waterproof or housed inside a housing that is transparent or includes a transparent imaging window. An example x-ray imaging monitor includes an x-ray source and a detector configured to detect x-rays. In situations where a substance, such as an opaque fluid, between a cutter imaging monitor and a cutter precludes or limits observation using visible light, the x-ray imaging monitor may be used instead of an optical camera. Each cutter in the pipe cutting tool may be monitored by a single cutter imaging monitor or may be separately monitored by its own corresponding cutter imaging monitor. In some implementations, one or more cutting conditions are determined based, at least in part, on input from a cutter imaging monitor, for example, using image or video recognition techniques.

In some implementations, the pipe cutting tool is configured to send a monitoring signal from a cutter imaging monitor to the wellbore surface for analysis by a computing device, a user, or both. The monitoring signal may be transmitted wirelessly, through a cable, or through a wire, for example. A user may use a signal from a cutter imaging monitor displayed on a computing device to observe progress of a cut or one or more cutting conditions including a condition of a cutter. In some implementations, the pipe cutting tool includes a manual override that a user can use to either change cutting parameters (for example, pressure applied by an actuator), to move the cutter between a pre-deployed and deployed position, or to stop cutting based, at least in part, on observing a display of the cutter imaging monitor signal. In some implementations, one or more cutting conditions based, at least in part, on one or more sensors outputs are provided to the computing system via a wired or wireless connection. In some implementations that do not include a cutter imaging monitor, a manual override may nonetheless be included.

In some implementations, as previously explained, a cutting condition used by a controller to determine when to send an actuation signal includes a condition where a first cutter pressure exceeds an initial or preset cutter pressure by a predetermined amount. For example, the cutting condition may be a first cutter pressure that exceeds an initial cutter pressure at the beginning of cutting. Initial pressure of a cutter may be preset, may be determined at a particular time after cutting begins (for example, within a certain number of seconds of when cutting begins, such as 5 seconds), or may be measured by a sensor in the cutter. In some implementations, a predetermined amount is a relative amount, such as at least 10% of a target value, at least 20% of the target value, at least 25% of the target value, at least 30% of the target value, at least 40% of the target value, or at least 50% of the target value. In some implementations, the predetermined amount is an absolute amount, such as at least 50 psi (0.345 MPa), at least 75 psi (0.517 MPa), at least 100 psi (0.69 MPa), at least 150 psi (1.03 MPa), or at least 200 psi (1.38 MPa). In some implementations, a first cutter pressure is determined continuously by a sensor, such as pressure sensor. Other cutting conditions may be used in addition to, or in place of, a pressure-based condition to trigger output of actuation signals. Examples of other cutting conditions include a wear condition of a cutter, a rotational velocity of a cutter, or a cutting-efficiency condition. These conditions may be determined, for example, using input from one or more sensors, as explained previously.

The extent to which a cutter may extend from central axis 112 in a deployed position may be settable by the controller. For example, the controller may be configured—for example, programmed or constructed—to actuate an actuator connected to the cutter so that the cutter extends to a predefined radial extent. The predefined radial extent can be changed (for example, by a user). In this way, in some implementations, the pipe cutting tool can be adjusted to cut pipes of different diameters or to control the cutting depth more precisely. For example, in some implementations, a radial extent from a central axis of a cutter in a deployed position can be set (for example, by the controller) to be anywhere between 4 in (101.6 mm) and 12 in (304.8 mm). For example, in some implementations, a radial extent of a cutter in a deployed position is settable anywhere in a range of between 4 in (101.6 mm) and 8 in (203.2 mm), between 5 in (127 mm) and 9 in (228.6 mm), between 6 in (152.4 mm) and 10 in (254 mm), or between 5 in (127 mm) and 8 in (203.2 mm). Each of a plurality cutters may extend the same amount or different amounts from the radial axis of the pipe cutting tool. For example, the maximum extension of one cutter in its deployed position may be greater than or less than the maximum extension of another, different cutter in its deployed position. Each of a plurality of cutters may extend the same amount or different amounts from the radial axis of the pipe cutting tool in its pre-deployed position.

In some implementations, pre-deployed positions of cutters, deployed positions of cutters, or both, are settable. In some implementations, the pre-deployed positions, deployed positions, or both pre-deployed and deployed positions of cutters may be set independently of the maximum range of actuation of the actuators to which the cutters are connected. For example, a pre-deployed position of a cutter connected to an actuator may be a position that does not correspond to a fully contracted state of the actuator. For example, a deployed position of a cutter connected to an actuator may be a position that does not correspond to a maximally extended state of the actuator. In some implementations, these positions may be configured manually prior to insertion of the pipe cutting tool into the pipe. In some implementations, the pre-deployed positions, deployed positions, or both, are dictated by the particular arrangement of elements in a pipe cutting tool.

In some implementations, a cutter or redundant cutter moves between its pre-deployed position and its deployed position manually. Manual movement includes a user sending an actuation signal to control the actuator to which the cutter is connected, thereby causing movement of the cutter to its deployed position. Movement from the deployed position to the pre-deployed position may occur manually in a similar manner. In some implementations, a first cutter is configured to move manually and each cutter that is redundant to the first cutter is configured to move automatically, for example as described in the next paragraph. Each redundant cutter may be controlled to move automatically and synchronously or automatically and independently.

In some implementations, a first cutter or redundant cutter moves between its pre-deployed position and its deployed position automatically. Automatic movement includes signals sent by the controller that are not prompted by an operator. In some implementations, to move the redundant cutter automatically between a pre-deployed position and a deployed position, an actuation signal is sent by a controller to the actuator that is connected to the redundant cutter to cause actuation. The controller may automatically send the actuation signal based, at least in part, on identification of one or more cutting conditions during cutting. In some implementations, the first cutter is deactivated automatically by a controller when one or more cutting conditions are determined to exist (for example, as determined by the controller). Deactivating the first cutter may include controlling, by the controller, the actuator connected to the first cutter such that the first cutter moves from its deployed position to its pre-deployed position. Deactivating a cutter may include stopping the cutter. For example, if a cutter comprises a rotatable blade, deactivating the cutter may include stopping rotation of the blade. As another example, if a cutter is a chemical torch, deactivating the cutter may include stopping flow of chemical necessary for cutting.

As previously explained, a redundant cutter includes a cutter that cuts in substantially the same place as another cutter. For example, if the redundant cutter is used for part or all of a cutting process in place of the first cutter, a complete cut that causes separation of and between pipe segments will still be made at a desired location. In some implementations, a redundant cutter recuts a portion of a pipe by cutting an arc of the pipe that has already been cut by the first cutter in a proximal location either above or below the initial arc that was cut. For example, a proximal location may be within 5 in (127 mm), within 4 in (101.6 mm), within 3 in (76.2 mm), or within 2 in (50.8 mm) of an initial cut. A cutter that is redundant to a first cutter may be located in close proximity to the first cutter in a pipe cutting tool. For example, a cutter that is redundant to the first cutter may be disposed in a horizontal plane perpendicular to a central axis of the pipe cutting tool within 36 in (914.4 mm), within 18 in (457.2 mm), or within 6 in (152.4 mm) of a horizontal plane in which the first cutter is disposed. In some implementations, a redundant cutter is disposed at least partially in a common plane with the first cutter if the redundant cutter and the first cutter are in their respective deployed positions. In some implementations, a first cutter and a redundant cutter cannot be in their deployed positions simultaneously but each is at least partially in the common plane when in its deployed position (at different times).

Redundant cutters may be configured—for example, constructed, connected, controlled, or arranged—to move together, for example synchronously, or independently. For example, every redundant cutter of a pipe cutting tool may be controllable to move automatically within a period of time such that when one or more cutting conditions are determined to be present, all redundant cutters move to their deployed positions within the period of time. Redundant cutters may be independent such that each is moveable separately from the others. For example, each of a plurality of independent redundant cutters can be moved to their respective deployed positions (and optionally moved back to their respective pre-deployed positions) in a sequential order as one or more cutting conditions are determined to be met for the redundant cutter currently being used. In this way, a plurality of independent redundant cutters act as independent back-ups, further prolonging the lifetime of a pipe cutting tool between servicings. In some implementations, a primary cutter continues to cut after a redundant cutter is moved to its deployed position, such that the redundant cutter acts a supplementary cutter assisting the primary cutter. A pipe cutting tool may have a mix of independent and synchronous redundant cutters.

In a pipe cutting tool having independent redundant cutters, a current cutter may be deactivated when one or more cutting conditions are determined to be present for the current cutter. For example, the one or more cutting conditions that cause deactivation of the current cutter may be the same as the one or more cutting conditions that cause a redundant cutter to be moved to its deployed position. Movement of the redundant cutter to its deployed position and deactivation of the current cutter may occur automatically once the one or more cutting conditions are determined to be present. In some implementations, cutting conditions that cause a cutter to extend to its deployed position may be different than cutting conditions that cause the cutter to retract to its pre-deployed position. The cutting conditions may be any one or combination of those described previously, for example.

In some implementations, a plurality of cutters are constructed and arranged in a pipe cutting tool such that each of the cutters is at least partially in a common plane when in its deployed position. For example, all cutters in the pipe cutting tool may be simultaneously in a deployed position during cutting and disposed at least partially in a common plane. In some implementations, the common plane is horizontal relative to a central axis of the pipe cutting tool. In some implementations, it may not be possible to deploy each of such cutters simultaneously, for example, if the cutters are each configured to occupy essentially the same place when deployed.

In some implementations, a plurality of cutters may be disposed at least partially in a common plane both in both their deployed and pre-deployed positions. For example, a plurality of cutters may be arranged in a side-by-side configuration both in their pre-deployed and deployed positions. In some implementations, the cutters are arranged in a stacked configuration, for example within a housing, when in their pre-deployed position and moving each of the cutters to its deployed position includes varying degrees of vertical movement, for example angled movement due to angled actuators. As such, one or more (or all) of a plurality of cutters may be angled relative to a plane intersecting the housing at a ninety degree angle, either in a pre-deployed position or in both a pre-deployed and deployed position. The primary cutter may be arranged to be flat and to lie in a common plane in its deployed position.

Figure 2:
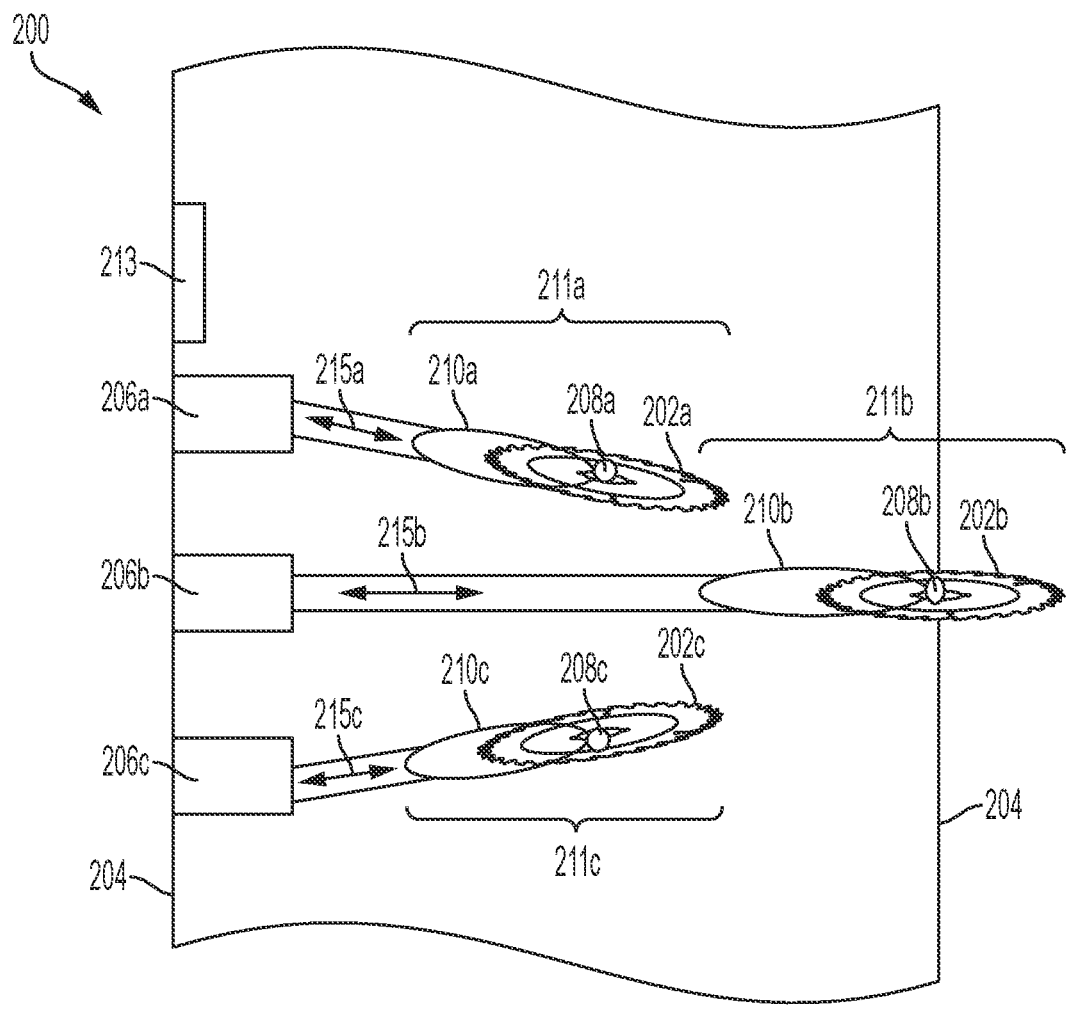
FIG. 2 is a side view of an example pipe cutting tool having separate actuators.

FIG. 2 shows an example pipe cutting tool 200. Pipe cutting tool 200 includes a plurality of separate actuators 206a-c and a corresponding plurality of cutters 211a-c. Actuators 206a-c are configured to move cutters 211a-c between pre-deployed and deployed positions. The directions of actuation of actuators 206a-c are shown by double arrowed lines 215a-c. As shown in FIG. 2, separate actuators may share common driving circuitry, mechanical driving components, or both while still being independently configured and operable. In this example, actuators 206a-c share no common electronic or mechanical subparts used for actuation. Each of the cutters 211a-c includes a rotatable blade 202a-c, a blade hub 208a-c, and an arm 210a-c that connects each cutter to its corresponding actuator. Cutters 211a,c are in pre-deployed positions (contained within housing 204) and cutter 211b is in a deployed position (extending beyond housing 204). Cutters 211a-c are configured to be independently actuated by actuators 206a-c. Controller 213 is electrically connected and provides actuation signals to actuators 206a-c to move cutters 211a-c, respectively.

Cutters 211a,c are angled relative to cutter 211b in both pre-deployed positions (as shown) and deployed positions (not shown). Cutters 211a,c and actuators 206a,c are angled such that if cutter 211a, cutter 211b, or cutter 211c is in its deployed position, the cutter will be disposed at least partially in a common horizontal plane. However, only one of cutters 211a-c can be in a deployed position at a time. FIG. 2 shows cutter 211b in its deployed position. If cutter 211b were moved to its pre-deployed, either of cutter 211a or cutter 211c could be independently extended to its deployed position. Therefore, each of cutters 211a-c is able to cut the pipe at the same location (although not at the same time), for example as defined by the pipe's circumference.

As shown in FIG. 2, only two cutters (cutters 211a,c) are angled with cutter 211a angled down and cutter 211c angled up. In some implementations, each cutter is angled either up or down. For example, three cutters may be disposed in a stacked configuration (for example as shown in FIG. 2) with each cutter disposed at a different downward or upward angle such that, upon actuation moving the cutter from its pre-deployed position to its deployed position, each cutter moves to a deployed position at a common cut level (for example, a common horizontal plane).

Cutter 211b is in a deployed position such that if pipe cutting tool 200 is disposed at least partially in a pipe of a certain radius (corresponding to the shown radial extent of cutter 211b), cutter 211b could cut the pipe in its shown state. Pipe cutting tool 200 is configured to automatically deactivate and move cutter 211b from its deployed position to its pre-deployed position when one or more cutting conditions are determined to be present (as previously described). When cutter 211b is deactivated and moved to its pre-deployed position, cutter 211a is configured to move, for example automatically, from its pre-deployed position (as shown in FIG. 2) to its deployed position extending beyond housing 204 (not shown) to resume the cutting of the pipe. Cutter 211a is configured to automatically deactivate and move from its deployed position to its pre-deployed position when one or more cutting conditions are determined to be present (for example, the same one or more cutting conditions as for cutter 211b). Cutter 211c is then automatically moved from its pre-deployed to deployed position to resume cutting in place of cutter 211a. Therefore, in this example, pipe cutting tool 200 is configured such that only one cutter (of cutters 211a-c) cuts at a time. The order of cutters as described in reference to FIG. 2 is arbitrary, and in other implementations other orders are used.

The housing of the pipe cutting tool can be made of any appropriate material and sized for the conditions in which the pipe cutting tool is to be operated. For example, the housing of the pipe cutting tool may be metal, plastic, or composite. The housing may have one or more openings, such as slots, through which a cutter can be moved when moving to a deployed position. For example, a cutter, such as a rotatable blade, may be disposed entirely within the housing when in a pre-deployed position and disposed at least partially outside of the housing when in a deployed position. In some implementations, the housing may have an outer diameter that is less than 4 in (101.6 mm), less than 3 in (76.2 mm), or less than 2 in (50.8 mm). Similarly, a cutter may have a radial extent from a central axis of a pipe cutting tool that is less than 4 in (101.6 mm), less than 3 in (76.2 mm), or less than 2 in (50.8 mm) in a pre-deployed position.

Figure 3B:
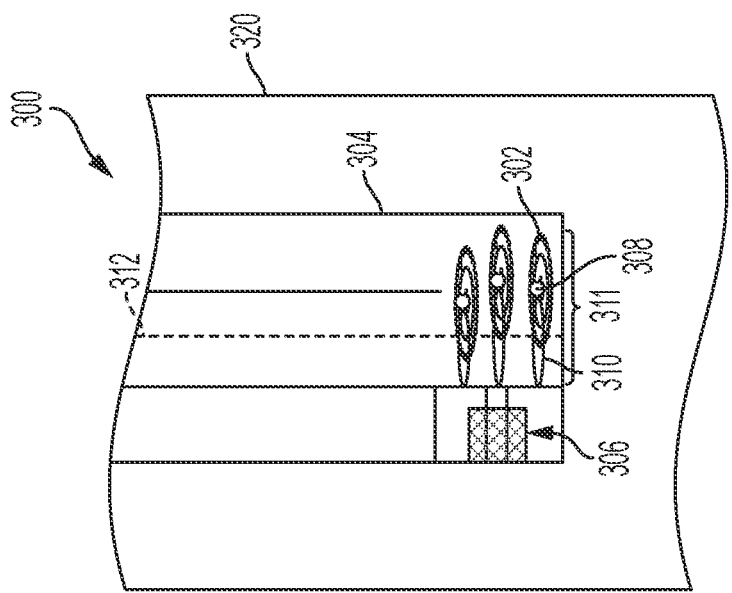
FIG. 3B is a side view of the pipe cutting tool of FIG. 3A.
Figure 3A:
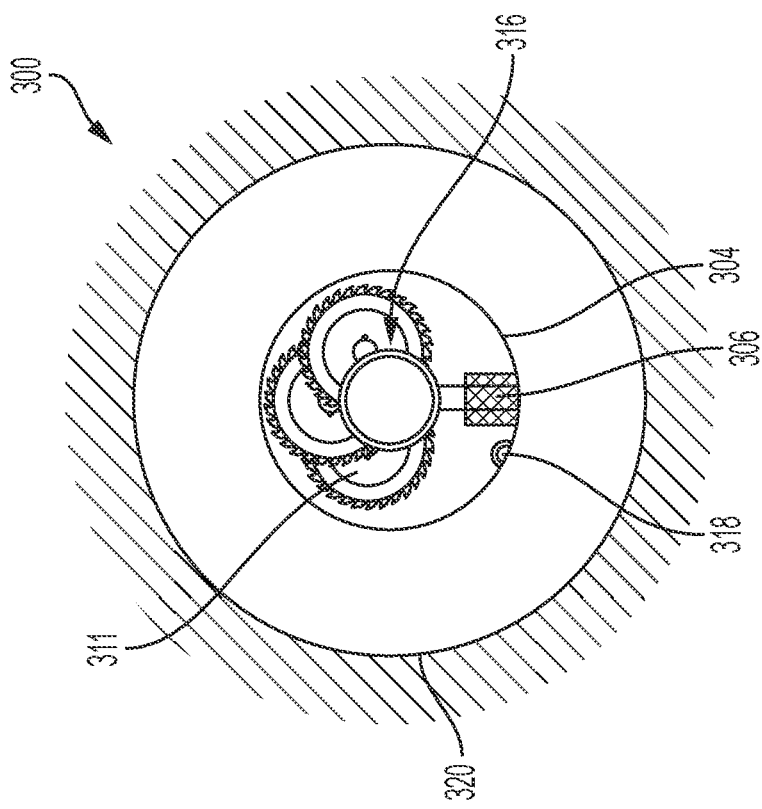
FIG. 3A is a plan view of an example pipe cutting tool having cutters in pre-deployed positions.
Figure 3D:
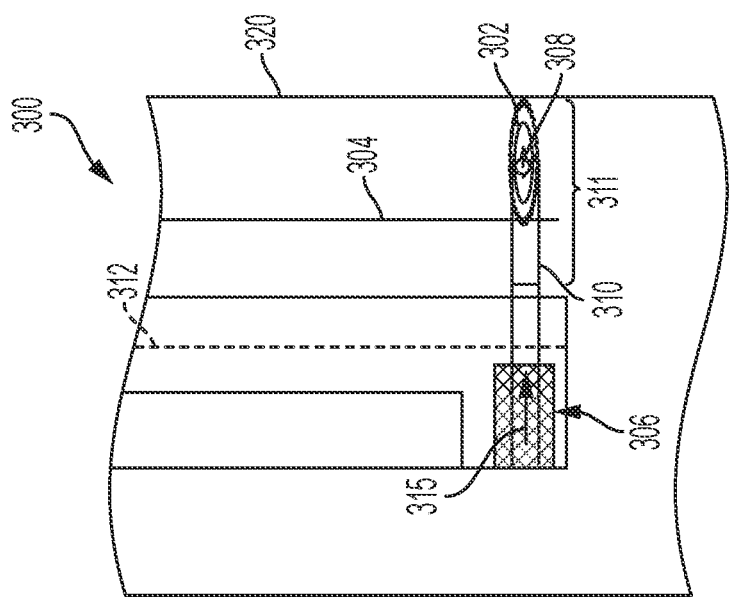
FIG. 3D is a side view of the pipe cutting tool of FIG. 3C.
Figure 3C:
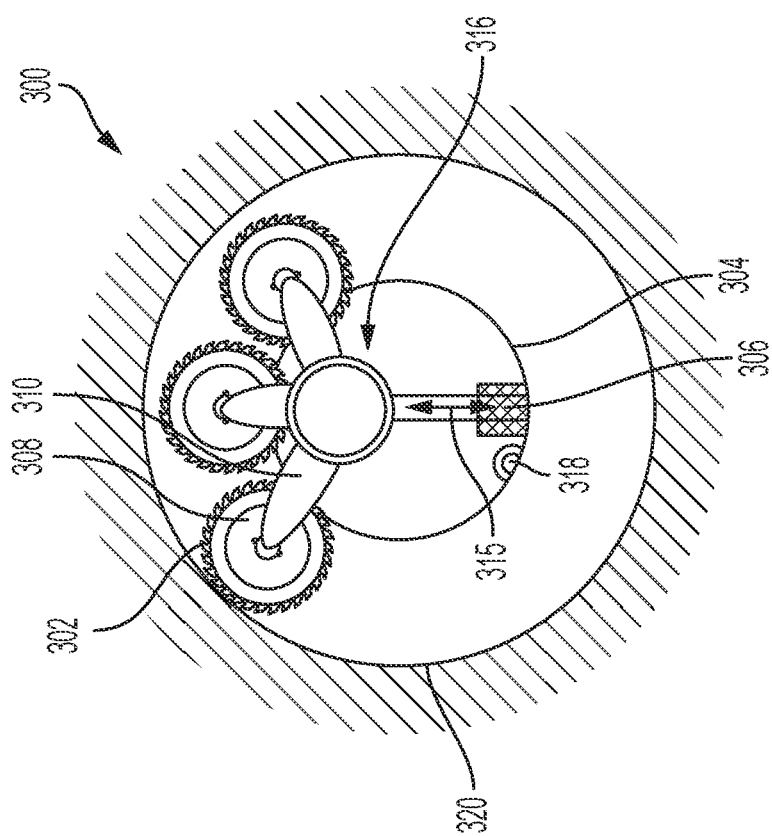
FIG. 3C is a plan view of the pipe cutting tool shown in FIGS. 3A and 3B with the cutters in deployed positions.

FIGS. 3A-3D show views of an example pipe cutting tool during its operation. FIGS. 3A and 3B show the example tool when the cutters are in pre-deployed positions. FIG. 3A is a plan view and FIG. 3B is a cross section. FIGS. 3C and 3D show the example tool when all cutters are in deployed positions. FIG. 3C is a plan view and FIG. 3D is a cross section.

Referring now to FIGS. 3A and 3B, an example pipe cutting tool 300 includes a plurality of cutters. Pipe cutting tool 300 is disposed within a pipe 320 in a wellbore. For simplicity, only one cutter 311 of the plurality of cutters is labeled; the others are arranged and constructed similarly. In its pre-deployed position, cutter 311 is disposed entirely within housing 304. For example, in its pre-deployed position, cutter 311 extends a distance from central axis 312 that is less than the radius of housing 304. The cutters are connected to a common actuator 306 through a central hub 316 that is moveable along with movement of the actuator. A cutter imaging monitor 318 is disposed on an interior surface of housing 304 to allow for monitoring of the plurality of cutters, for example cutter 311, by a user in substantially real-time during cutting. Cutter 311 includes a rotatable blade 302, a blade hub 308, and an arm 310.

Referring now to FIGS. 3C and 3D, example pipe cutting tool 300 is shown with each cutter in a deployed position.

The cutters were in a stacked configuration in their pre-deployed positions. In moving to deployed positions due to actuation by actuator 306, the cutters fan out and shift, at least partially, into a common horizontal plane. For example, a spring loaded mechanism may be employed to cause the fanning to occur when central hub 316 moves due to actuation by actuator 306 (along direction 315). As can be seen by comparison between FIGS. 3C and 3D and FIGS. 3A and 3B, the cutters have a radial extent from central axis 312 that is greater in a deployed position than in a pre-deployed position. In this example implementation, only the left most cutter, as view in FIG. 3C, is in contact with pipe 320 to cut. The other cutters may be further positioned into contact with pipe 320 to cut, for example, by additional actuation of actuator 306 or by rotation of central hub 316, or both. In some implementations, all cutters in a deployed position may be in contact with a pipe when one or more of the cutters is cutting.

Figure 4:
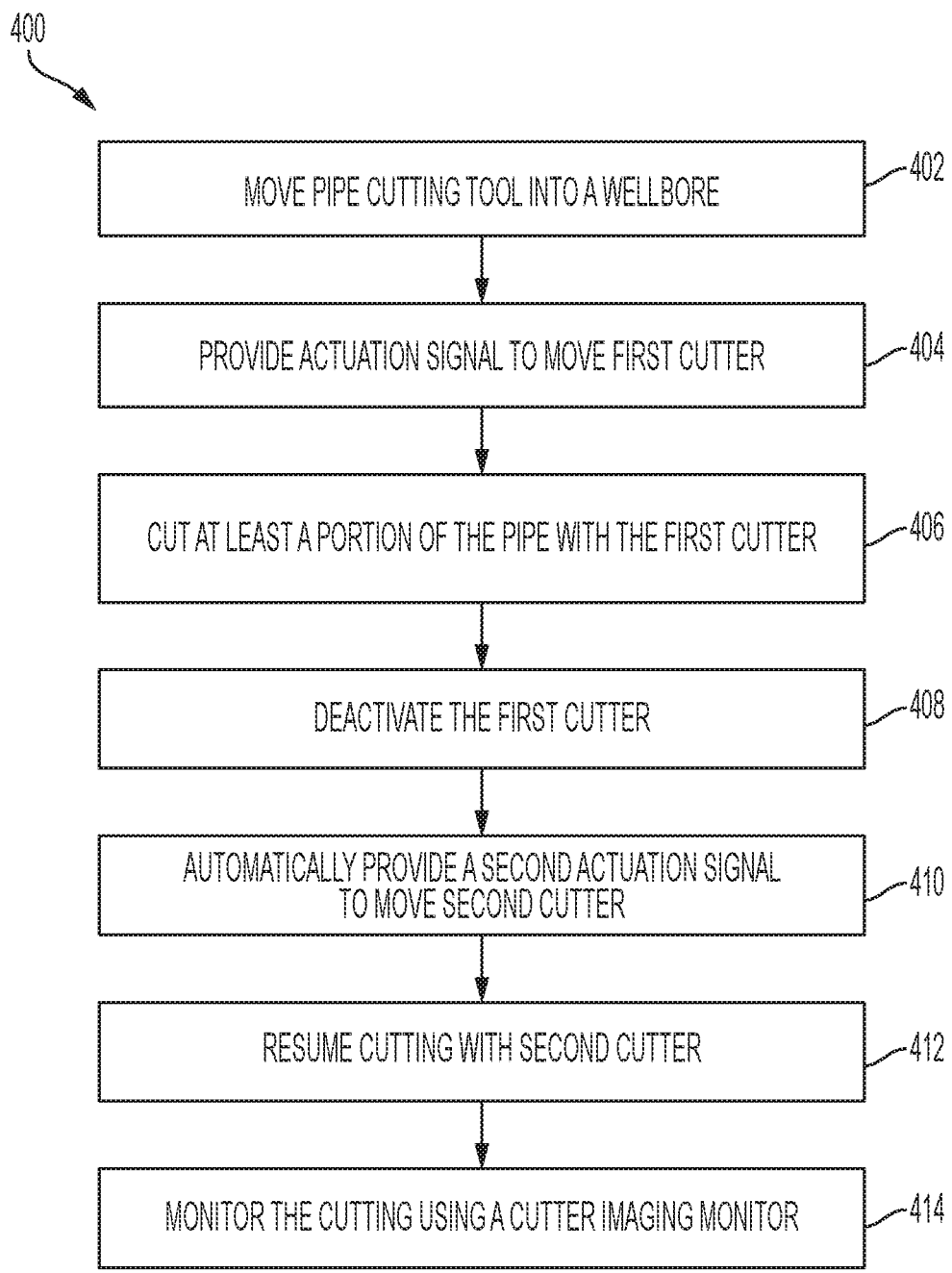
FIG. 4 is a flow diagram of an example method of using a pipe cutting tool.

FIG. 4 is a flowchart showing an example process 400 for using the pipe cutting tool. The pipe cutting tool may be of the type described with respect to FIGS. 1A, 1B, 2, 3A, and 3B. In operation 402, the pipe cutting tool is moved into in a wellbore. For example, as described previously, the pipe cutting tool includes a first cutter and at least one redundant second cutter. The first cutter and second cutter are each moveable by an actuator. Each of the first cutter and the second cutter may be moved by a separate actuator or, alternatively, a common actuator. In operation 404, an actuation signal is sent to the actuator that is connected to the first cutter to move the first cutter from a pre-deployed position to a deployed position, such that the first cutter is in a position to cut. The actuation signal may be sent, for example, automatically by a controller. In some implementations, the actuation signal is sent by a user from a computing system located uphole, for example when an actuation signal is an emergency override signal that stops cutting. In operation 406, at least a portion of a pipe is cut by the first cutter while it is in the deployed position.

Operations 408-412 are performed to deploy the second cutter and resume cutting. In operation 408, the first cutter is deactivated automatically to prevent it from cutting further. Such prevention may be desirable, for example, to prevent damage to the pipe cutting tool. As discussed in this specification, deactivating the first cutter may occur automatically if one or more cutting conditions are determined to be present, for example by a controller. Deactivating the first cutter may optionally include retracting the first cutter from the deployed position to the pre-deployed position, for example by sending a new actuation signal to the actuator connected to the first cutter using a controller. In some implementations, operation 408 is not performed. In operation 410, a second actuation signal is automatically provided to the redundant second cutter to move the second cutter to its deployed position from its pre-deployed position. As discussed in this specification, the second signal may be sent automatically by a controller, for example, if one or more cutting conditions have been determined to be present. Upon completion of operation 410, the second redundant cutter is in position to continue cutting. The pipe cutting tool may include one or more additional redundant cutters configured to provide additional redundancy similar to the redundant second cutter. For example, if the redundant second cutter becomes dull, one or more cutting conditions may be determined to be present for the second cutter that causes a third cutter to be used instead. In operation 412, cutting of the pipe is resumed with the second cutter.

In operation 414, the cutting is monitored using a cutter imaging monitor, such as an optical camera or x-ray imaging monitor. The monitoring may optionally include sending a monitoring signal to the wellbore surface for viewing, analysis, or both by a user, a computing device, or both. Operation 414 may occur, for example, during some or all of any one or combination of operations 402-412.

All or part of the tools and processes described in this specification and their various modifications may be controlled at least in part by a control system, such as an uphole computing system. The control system may be comprised of one or more computing systems using one or more computer programs. Examples of computing systems include, either alone or in combination, one or more desktop computers, laptop computers, servers, server farms, and mobile computing devices such as smartphones, features phones, and tablet computers.

The computer programs may be tangibly embodied in one or more information carriers, such as in one or more non-transitory machine-readable storage media. A computer program can be written in any form of programming language, including compiled or interpreted languages, and it can be deployed as a stand-alone program or as a module, part, subroutine, or unit suitable for use in a computing environment. A computer program can be deployed to be executed on one computer system or on multiple computer systems at one site or distributed across multiple sites and interconnected by a network.

Actions associated with implementing the processes may be performed by one or more programmable processors executing one or more computer programs. All or part of the tool, such as the controller contained in the tool, may be implemented using special purpose logic circuitry, for example, an field programmable gate array (FPGA) or an ASIC application-specific integrated circuit (ASIC), or both.

Processors suitable for use as the controller and to execute computer programs include, for example, both general and special purpose microprocessors, and include any one or more processors of any kind of digital computer. Generally, a processor will receive instructions and data from a read-only storage area or a random access storage area, or both. Components of a computing system include one or more processors for executing instructions and one or more storage area devices for storing instructions and data. Generally, a computer and a controller will also include one or more machine-readable storage media, or will be operatively coupled to receive data from, or transfer data to, or both, one or more machine-readable storage media.

Non-transitory machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks such as internal hard disks or removable disks, magneto-optical disks, and CD (compact disc) ROM (read only memory) and DVD (digital versatile disk) ROM.

A computing device may include a hard drive for storing data and computer programs, one or more processing devices (for example, a microprocessor), and memory (for example, RAM) for executing computer programs.

Elements of different implementations described may be combined to form other implementations not specifically set forth previously. Elements may be left out of the tools and processes described without adversely affecting their operation or operation of the overall system in general. Furthermore, various separate elements may be combined into one or more individual elements to perform the functions described in this specification.

Throughout the description, where apparatus are described as having, including, or comprising specific components, or where processes and methods are described as having, including, or comprising specific operations, it is contemplated that, additionally, there are apparatus that consist essentially of, or consist of, the recited components, and that there are processes and methods that consist essentially of, or consist of, the recited processing operations.

It should be understood that the order of operations or order for performing certain action is immaterial so long as the process or method remains configured. Moreover, two or more operations or actions may be conducted simultaneously.

In this specification, unless otherwise clear from context or otherwise explicitly stated, (i) the term "a" may be understood to mean "at least one"; (ii) the term "or" may be understood to mean one or the other or both; and (iii) where ranges are provided, endpoints are included. Any numerals used in this application with or without about/approximately are meant to cover any normal fluctuations appreciated by one of ordinary skill in the relevant art.

Other implementations not specifically described in this specification are also within the scope of the following claims.

What is claimed is:

1. A pipe cutting tool comprising:
  a plurality of cutters;
  an actuator connected physically to the plurality of cutters, the actuator being configured to extend and to retract to move each of the plurality of cutters between a deployed position and a pre-deployed position, respectively;
  one or more sensors for monitoring one or more conditions associated with the plurality of cutters;
  a control system for outputting one or more signals to control extending or retracting the actuator based on the one or more conditions; and
  a housing to hold the one or more actuators and the plurality of cutters,
  where, for each of the plurality of cutters, (i) the cutter is disposed entirely within the housing in the pre-deployed position and (ii) the cutter extends at least partially outside of the housing in the deployed position.

2. The pipe cutting tool of claim 1, where the plurality of cutters comprise a first cutter and a second cutter; and
  where, the second cutter is configured to move from the pre-deployed position to the deployed position automatically based, at least in part, on the one or more conditions.

3. The pipe cutting tool of claim 1, where each of the plurality of cutters is associated with a respective one or more of the one or more sensors.

4. The pipe cutting tool of claim 1, further comprising:
  a cutter imaging monitor configured to monitor at least one of the plurality of cutters during operation, where the cutter imaging monitor comprises at least one of an x-ray imaging monitor, an optical camera, or an acoustic camera.

5. The pipe cutting tool of claim 4, where the cutter imaging monitor is configured to send a monitoring signal to a remote computing system, the monitoring signal representing real-time operation of one or more of the cutters.

6. The pipe cutting tool of claim 1, where, for each of the plurality of cutters, the cutter lies at least partially in a common horizontal plane when in the deployed position.

7. The pipe cutting tool of claim 1, where, for each cutter of the plurality of cutters, the cutters comprises a rotatable blade, a blade hub, and an arm, where (i) the blade hub is configured to cause the rotatable blade to rotate about a central axis of the blade hub, (ii) the blade hub is connected to the arm at a first end of the arm, and (iii) the arm is connected to the actuator at a second end of the arm opposite the first end.

8. The pipe cutting tool of claim 1, further comprising:
  a housing to hold the actuator and the plurality of cutters;
  where the housing has an outer diameter of less than 3 inches.

9. The pipe cutting tool of claim 1, where a radial extent of a cutter from a central axis of the pipe cutting tool is less than 3 inches when the cutter is in the pre-deployed position.

10. The pipe cutting tool of claim 1, where a radial extent of a cutter from a central axis of the pipe cutting tool is at least 4.5 inches when the cutter is in the deployed position.

11. The pipe cutting tool of claim 1, where the actuator is configured to provide at least 750 psi of outward pressure to each cutter making a cut during cutting.

12. The pipe cutting tool of claim 1, where the actuator comprises a piston.

13. A pipe cutting tool comprising:
  a plurality of cutters;
  an actuator connected physically to the plurality of cutters, the actuator being configured to extend and to retract to move each of the plurality of cutters between a deployed position and a pre-deployed position, respectively;
  one or more sensors for monitoring one or more conditions associated with the plurality of cutters; and
  a control system for outputting one or more signals to control extending or retracting the actuator based on the one or more conditions,
  where the control system is configured to set the deployed position based on a radius of a pipe to be cut.

14. A pipe cutting tool comprising:
  a plurality of cutters;
  an actuator connected physically to the plurality of cutters, the actuator being configured to extend and to retract to move each of the plurality of cutters between a deployed position and a pre-deployed position, respectively;
  one or more sensors for monitoring one or more conditions associated with the plurality of cutters; and
  a control system for outputting one or more signals to control extending or retracting the actuator based on the one or more conditions,
  where the plurality of cutters comprise a first cutter and a second cutter,
  where, the second cutter is configured to move from the pre-deployed position to the deployed position automatically based, at least in part, on the one or more conditions, and
  where the one or more conditions comprise a first cutter pressure that exceeds an initial or preset first cutter pressure by a predetermined amount.

15. A pipe cutting tool comprising:
  a plurality of cutters;

an actuator connected physically to the plurality of cutters, the actuator being configured to extend and to retract to move each of the plurality of cutters between a deployed position and a pre-deployed position, respectively;

one or more sensors for monitoring one or more conditions associated with the plurality of cutters; and a control system for outputting one or more signals to control extending or retracting the actuator based on the one or more conditions, where, in the deployed position, one or more of the cutters is angled relative to the common horizontal plane.

16. A pipe cutting tool comprising:

a plurality of cutters;

an actuator connected physically to the plurality of cutters, the actuator being configured to extend and to retract to move each of the plurality of cutters between a deployed position and a pre-deployed position, respectively;

one or more sensors for monitoring one or more conditions associated with the plurality of cutters; and a control system for outputting one or more signals to control extending or retracting the actuator based on the one or more conditions, where the plurality of cutters comprise a first cutter, a second cutter, and a third cutter and the third cutter is redundant to the first cutter and to the second cutter.

17. A pipe cutting tool comprising:

a plurality of cutters;

an actuator connected physically to the plurality of cutters, the actuator being configured to extend and to retract to move each of the plurality of cutters between a deployed position and a pre-deployed position, respectively;

one or more sensors for monitoring one or more conditions associated with the plurality of cutters; and a control system for outputting one or more signals to control extending or retracting the actuator based on the one or more conditions, where the one or more signals cause the actuator to supply a controlled cutting pressure.

* * * * *